W. FURNAS.
Wheel-Cultivator.
No. { 2,830, 33,834. }
Patented Dec. 3, 1861
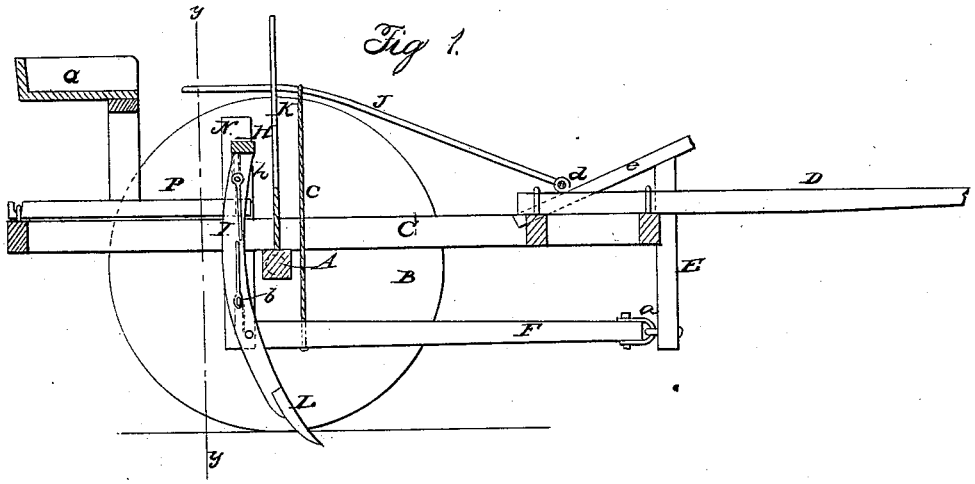
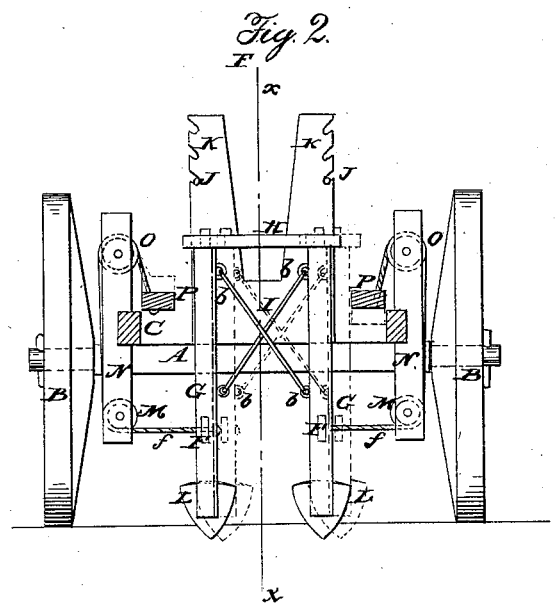

UNITED STATES PATENT OFFICE.

WILKENSON FURNAS, OF ONONWA, IOWA.

IMPROVEMENT IN PLOWS.

Specification forming part of Letters Patent No. 33,834, dated December 3, 1861.

*To all whom it may concern:*

Be it known that I, WILKENSON FURNAS, of Ononwa, in the county of Louisa and State of Iowa, have invented a new and Improved Plow; and I do hereby declare that the following is a full, clear, and exact description of the same, reference being had to the annexed drawings, making a part of this specification, in which—

Figure 1 is a side sectional view of my invention, taken in the line $x\,x$, Fig. 2; Fig. 2, a transverse vertical section of the same, taken in the line $y\,y$, Fig. 1.

Similar letters of reference indicate corresponding parts in the two figures.

This invention relates to an improved plow of that class which is designed for cultivating growing plants in hills or drills—such as corn, potatoes, &c.

The object of the invention is to so arrange the plows that they may be adjusted both laterally and vertically, so as to regulate the depth of the furrows as may be desired and also the position or course of the furrows relatively with the plants as occasion may require.

To enable those skilled in the art to fully understand and construct my invention, I will proceed to describe it.

A represents an axle, which is provided with two wheels, B B, of equal diameter, and to which a rectangular frame, C, is secured.

D is a draft-pole, attached to the front part of the frame C; and E E' are two pendants at the front part of frame C, to the lower ends of which horizontal bars F F are connected by universal joints $a\,a$. The bars F F extend a trifle back of the axle A, and each has a plow foot or standard, G, attached. These feet or standards extend up some distance above the axle A, and are connected at their upper ends by a cross-bar, H. The feet or standards G G are connected by cross-rods I, the ends of which are attached to the standards G by joints $b$. Each bar F is connected by a chain or cord, $c$, with a lever, J, the front ends of which are connected by joints $d$ to inclined bars $e$ at the front end of frame $c$. The levers J J rest in vertical racks K K, attached to frame C, and by adjusting these levers in the racks plows L L at the ends of the feet or standards G G may be more or less elevated to make furrows of greater or less depth, as may be desired. Each bar F has a cord or chain, $f$, attached to it near its lower end, and these cords or chains pass under pulleys M at the lower ends of vertical bars N N of the frame C. The cords or chains F F extend upward at the outer sides of the bars N N, and pass over pulleys O O at the upper ends of said bars, and are attached to treadles P, one at each side of the frame C.

Q is the driver's seat at the back part of frame C. This seat has such a position that the feet of the driver may readily operate the treadles P, while his hands may conveniently grasp the levers J.

From the above description it will be seen that the driver, by actuating the treadles P, may give the plows a lateral movement either to the right or to the left, so that the plows may be made to conform to the position of the plants when not in line, and the plants thereby prevented from being plowed out—a contingency of frequent occurrence with stationary plows or shares. The plows, it will be seen, are under the complete control of the operator.

The feet or standards G G may be placed at a greater or less distance apart by adjusting them in different holes in the cross-bar H.

I do not claim laterally moving or adjustable plows, for they have been used; but I do claim as new and desire to secure by Letters Patent—

The arrangement of the pulley-bars N N, pulleys M $o$, treadles P, levers J J, cords $c\,c$, bars F F, and racks K K with the swinging and rising plow-standards G G and the driver's seat Q, all as herein shown and described.

WILKENSON FURNAS.

Witnesses:
   JACOB HOUSE,
   A. J. RUNYON.